United States Patent [19]
Grosseau

[11] 3,891,278
[45] June 24, 1975

[54] BRAKING SYSTEM WITH DUAL INDEPENDENT CIRCUITS

[75] Inventor: Albert Grosseau, Chaville, France

[73] Assignee: S. A. Automobiles Citroen, Paris, France

[22] Filed: July 2, 1973

[21] Appl. No.: 375,851

[30] Foreign Application Priority Data
July 3, 1972  France .............................. 72.24395

[52] U.S. Cl............. 303/21 F; 188/106 P; 303/6 R; 303/21 AF
[51] Int. Cl................................................. B60t 8/06
[58] Field of Search ............ 303/21 F, 21 AF, 22 R, 303/61–63, 6 R, 68–69; 188/181 A, 106 P

[56] References Cited
UNITED STATES PATENTS

| | | |
|---|---|---|
| 3,674,317 | 7/1972 | Mangold........................ 303/21 AF |
| 3,722,960 | 3/1973 | Von Lowis of Menar ........ 303/21 F |
| 3,743,363 | 7/1973 | Hooge et al. ..................... 303/21 F |

Primary Examiner—Duane A. Reger
Assistant Examiner—D. C. Butler
Attorney, Agent, or Firm—Eyre, Mann & Lucas

[57] ABSTRACT

A vehicle braking system comprises two independent braking circuits. One of the circuits incorporates a valve controlled in dependence of wheel slip to reduce the pressure in the circuit so as to prevent wheel lock. The other circuit incorporates a valve controlled in dependence on the pressure in the first circuit downstream of the valve therein.

8 Claims, 4 Drawing Figures

BRAKING SYSTEM WITH DUAL INDEPENDENT CIRCUITS

BACKGROUND OF THE INVENTION

1. Field of the Invention

The present invention relates to vehicle braking systems.

2. Description of the Prior Art

For reasons of safety, two independent braking circuits are often provided to effect the braking of one or more wheels of an automobile vehicle. One of the braking circuits can, for instance, effect braking of the front wheels and the other can effect braking of the front wheels and also of the rear wheels.

It has been proposed to provide, in a hydraulic circuit for braking a wheel, a valve which is controlled in accordance, for instance, with the slipping of the wheel in such a manner as to reduce the pressure in the circuit, progressively or otherwise, when the wheel slip reaches a certain value so as to prevent locking of the wheel.

When the same wheel is associated with two brake actuator devices each supplied with fluid from a different circuit and it is desired to avoid all risk of wheel lock, it would, in theory, be necessary to provide two such pressure-reducing valves each interposed in a respective one of the braking circuits; however, such an arrangement would be costly and complex. Also, in the case of an "all or nothing" valve, that is a valve which places the brake actuator devices in communication either with the source of pressure or with the outlet without any possibility or varying the pressure in accordance with the signal representing the difference between the abnormal dynamic state of the wheel and the normal state, it would be possible to provide a single valve slide adapted to control simultaneously the two circuits. It would then be necessary to double the number of auxiliary hydraulic members generally necessary for establishing the laws of rise and fall of pressure.

SUMMARY OF THE INVENTION

According to the present invention, there is provided in a braking system for a vehicle having at least one wheel, first and second brake actuator means, at least the first actuator means being arranged to brake the said wheel, first and second independent fluid circuits operative to feed pressurised fluid to the first and second actuator means, respectively, first valve means controlled in dependence on the dynamic state of the wheel and incorporated in the first fluid circuit, and second valve means controlled in dependence on the pressure downstream of the first valve means, the second valve means being incorporated in the second fluid circuit, and the second valve means being a quantity-regulating valve and comprising a first movable member subjected to a control force determined by the pressure downstream of the first valve means and to an opposing force determined by the pressure of fluid delivered by the second valve means, the first movable member being arranged to place the second actuator means in communication with the second fluid circuit or with a fluid outlet, according to the position of the first movable member, and a second movable member controlled in dependence on the pressure of the first circuit upstream of the first valve means, the arrangement being such that when the latter pressure is zero, the second movable member locks the first movable member in a position to provide free supply of fluid to the second actuator means.

Further according to the present invention, there is provided in a braking system for a vehicle having at least one wheel, first and second brake actuator means, at least the first actuator means being arranged to brake the said wheel, first and second independent fluid circuits operative to feed pressurised fluid to the first and second actuator means respectively, first valve means incorporated in the first fluid circuit, said first valve means being controlled in dependence on the dynamic state of the wheel whereby to prevent locking of the wheel, and second valve means incorporated in the second fluid circuit, said second valve means being controlled in dependence on the pressure in the first circuit downstream of the first valve means.

BRIEF DESCRIPTION OF THE DRAWINGS

Embodiments of the invention will now be described, by way of example only, with reference to the accompanying diagrammatic drawings, in which.

DESCRIPTION OF THE PREFERRED EMBODIMENT

Figure 1:
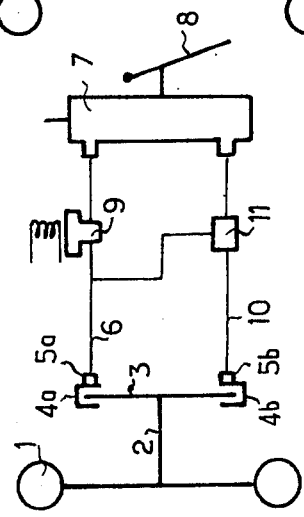
FIG. 1 shows schematically a first embodiment of a vehicle braking system in accordance with the present invention.

In the embodiment shown in FIG. 1, a wheel 1 has an axle rigid with a disc 3 which can be braked by two braking members 4a and 4b controlled by brake cylinders 5a and 5b. The brake cylinder 5a is connected by a circuit 6 to a quantity-regulating valve 7 which is connected to a source of pressure (not shown in the drawings) and is controlled by a brake pedal 8. An electrically-operated valve 9 incorporated in the circuit 6 is controlled in a manner known per se in accordance with the slip of the wheel 1 on the ground so as to break the circuit 6 progressively or otherwise when the slip reaches a certain value. The brake cylinder 5b is connected to the valve 7 by a circuit 10 in which a quantity-regulating valve 11 is incorporated; the valve 11 is controlled by the pressure downstream of the valve 9.

When the slip of the wheel 1 on the ground reaches a predetermined value, the valve 9 closes the circuit 6 so that the pressure decreases downstream from this valve. This drop in pressure is repeated in the circuit 10 by the quantity regulator 11. As a result, the pressure decreases both in the brake cylinder 5a and in the brake cylinder 5b and all risk of locking of the wheel 1 is avoided.

Figure 2:
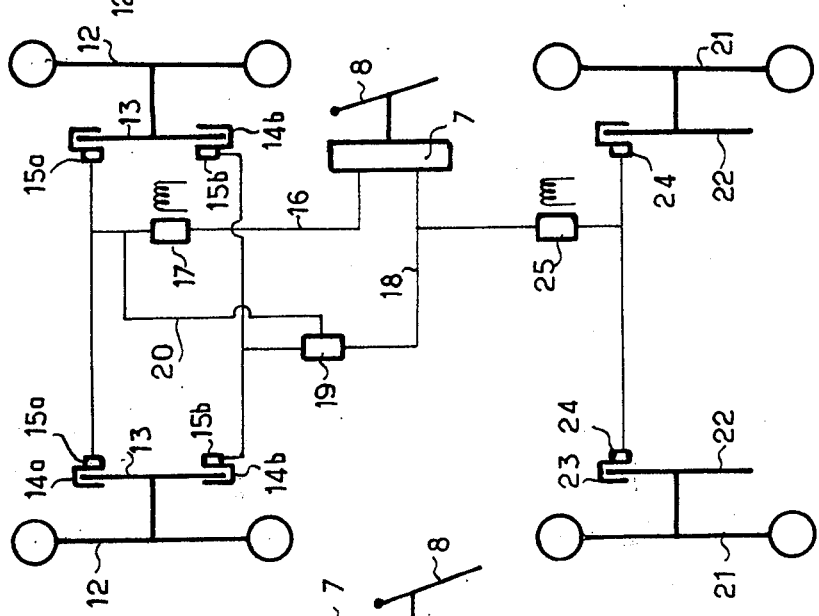
FIG. 2 shows schematically a second embodiment of a vehicle braking system.

In the embodiment illustrated in FIG. 2, each of the front wheels 12 of a vehicle is rigid with a brake disc 13 which can be braked by two braking members 14a and 14b controlled by brake cylinders 15a and 15b. The brake cylinders 15a are connected to the quantity-regulating valve 7 by a braking circuit 16 in which an electrically-operated valve 17 is incorporated, the valve 17 being controlled in accordance with the slip of the wheels 12 on the ground. The brake cylinders 15b are connected to the quantity-regulating valve 7 by a second braking circuit 18 in which a quantity-regulating valve 19 is incorporated. The valve 19 is controlled by the pressure downstream of the electrically-operated valve 17, the valve 19 being connected to the circuit 16 downstream of the valve 17 by a duct 20.

Each of the rear wheels 21 is rigid with a brake disc 22 which can be braked by a braking member 23 controlled by a brake cylinder 24. The brake cylinders 24 are connected to the braking circuit 18 by an electrically-operated valve 25 controlled in accordance with the slip of the wheels 21 on the ground.

Excessive slip of the front wheels 12 on the ground produces a decrease in pressure in the brake cylinder 15a by means of the electrically-operated valve 17 and in the brake cylinders 15b by means of the quantity-regulating valve 19. In a similar manner, slipping of the rear wheels 21 on the ground produces a decrease in the pressure in the brake cylinders 24 by means of the electrically-operated valve 25.

In the event of a leak occurring in the circuit 18, the circuit 16 continues to be fed with fluid whereby the front wheels 12 can still be braked; locking of the front wheels will still be prevented by the valve 17. In the event of a leak occuring in the circuit 16, the circuit 18 is still supplied with fluid whereby the front wheels 12 and the rear wheels 21 can still be braked, locking of the latter wheels being prevented by the valve 25.

Figure 3:
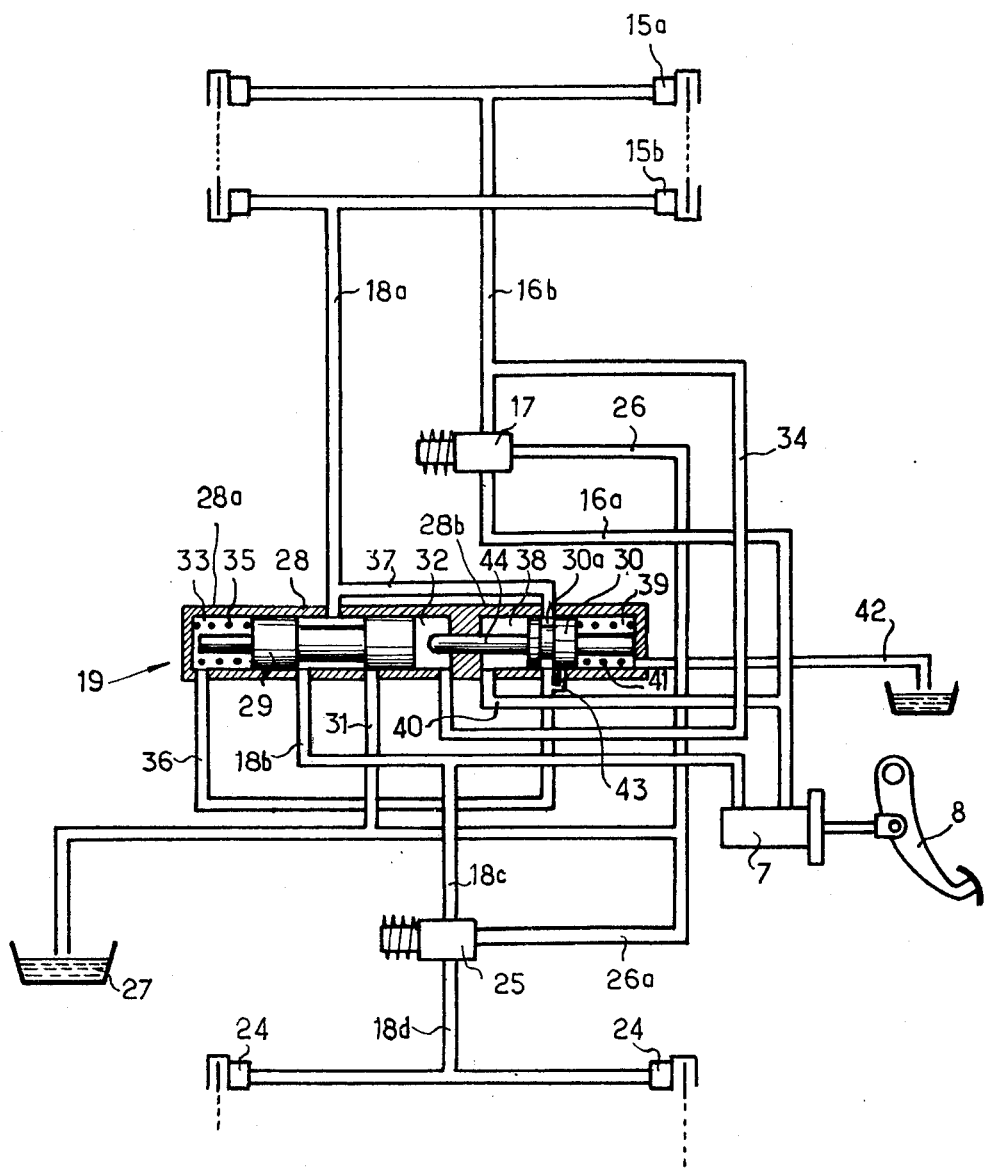
FIG. 3 shows the braking system of FIG. 2 in greater detail.

A preferred form of the quantity-regulating valve 19 is shown in greater detail in FIG. 3, wherein the electrically-operated valve 17 is interposed between a duct 16a connected to the distributor 7, a duct 16b connected to the brake cylinders 15a, and a return duct 26 connected to a reservoir 27. Under normal conditions the valve 17 is completely open and the pressure in the ducts 16a and 16b are equal. If there is a risk of wheel lock, the valve 17 breaks the connection between the ducts 16a and 16b and establishes a connection between the ducts 16b and 26 whereby the pressure in the duct 16b is less than the pressure pressure prevailing in the duct 16a, that is to say less than the pressure supplied by the quantity-regulating valve 7.

The quantity-regulating valve 19 comprises a body 28 having two aligned bores 28a and 28b, each slidably mounting a respective slide 29 and 30. The slide 29 is movable in front of orifices communicating respectively with the brake cylinders 15b through a duct 18a, with the distributor 7 through a duct 18b, and with a return duct 31 leading to the reservoir. The slide 29 bounds two chambers 32 and 33 in the cylinder 28. The chamber 32 is connected to the duct 16b through a duct 34, and the chamber 33 contains a spring 35 which acts on the slide 29. A duct 36 connects the chamber 33 with the bore 28b whereby the duct 36 can, via a groove 30a in the slide 30, be placed in communication with the duct 37 connected to the duct 18a.

The slide 30 bounds two chambers 38 and 39 in the bore 28. The chamber 38 is connected to the duct 16a by a duct 40, and the chamber 39 contains a spring 41 which is stronger than the spring 35, and is connected to the reservoir by a duct 42; the chamber 39 can be placed in communicating with the duct 36 through a branch duct 43. The slide 30 is rigid with a thrust member 44 which extends through a bore in the wall separating the bores 28a and 28b and can come into contact with the slide 29 to push the slide 29 against the bias of the spring 35.

The valve 25 is interposed between a duct 18c communicating with the duct 18b and a duct 18d connected to the brake cylinders 24. A return duct 26a is connected to the duct 26.

Under normal conditions, the pressure downstream of the valve 17 is the pressure determined by the quantity-regulating valve 7 and this pressure prevails in the chamber 32; the chamber 33, on the other hand, communicates with the duct 18a via the groove 30a and the duct 37. The slide 29 takes up an equilibrium which is substantially the fully open position of the valve 19 (the position shown in FIG. 3). The chamber 39 is connected to the reservoir whereas the pressure determined by the valve 7 prevails in the chamber 38, and in spite of the opposing action of the spring 41, this pressure keeps the slide 30 in the extreme right-hand position in which the groove 30a places the ducts 36 and 37 in communication.

When the valve 17 comes into operation, the pressure in the duct 16b decreases; the pressure in the chamber 32 also decreases, so that the slide 29 is displaced towards the right and progressively closes the orifice of the duct 18b while the orifice of the duct 31 is progressively uncovered. The result is a drop in pressure in the duct 18a and therefore in the brake cylinders 15b, and this drop in pressure depends on the drop in pressure in the brake cylinders 15a.

If a leak occurs in the circuit 18a–18b, the position of the slides is not changed and the circuit 16a–16b continues to be fed with fluid. If a leak occurs in this latter circuit, the pressure in the chambers 32 and 38 decreases and the slide 30 is displaced towards the left under the action of the return spring 41. The communication between the ducts 36 and 37 is interrupted and the duct 36 is placed in communication with the reservoir through the duct 43, the chambers 39, and the duct 42. On the other hand the thrust member 44 of the slide 30 comes into contact with the slide 29 and keeps this slide in its fully open position, that is to say its extreme left-hand position, since the action of the spring 41 dominates that of the spring 35. The front brake cylinders 15b therefore continue to be fed with fluid, and the rear brake cylinders continue to be fed with fluid through the valve 25.

It will be noted that in the absence of braking pressure the slide 29 is kept in its extreme left-hand position by the spring 41 through the intermediary of the slide 30 and the thrust member 44, so that as soon as braking begins, the rise in pressure in the cylinders 15b takes place without delay with respect to that in the cylinder 15a.

Figure 4:
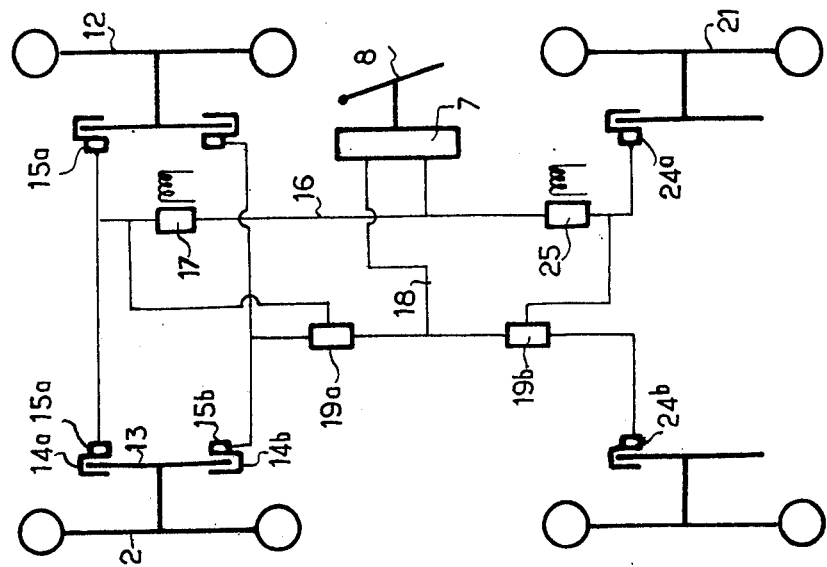
FIG. 4 shows schematically a third embodiment of a vehicle braking system.

In the embodiment illustrated in FIG. 4, the braking circuit 16 is connected to the front brake cylinders 15a via the intermediary of the valve 17, and to the braking cylinder 24a of one of the rear wheels 21 by the valve 25. On the other hand, the braking circuit 18 is connected to the front braking cylinders 15b by a quantity-regulating valve 19a controlled in dependence on the pressure downstream of the valve 17, and to the second brake cylinder 24b through a quantity-regulating valve 19b controlled in dependence on the pressure downstream of the valve 25; this quantity-regulating valve can be constructed as shown in FIG. 3.

The present invention is especially applicable to automobile braking systems.

What is claimed is:

1. In a braking system for a vehicle having at least one wheel,
   first and second brake actuator means, at least the first actuator means being arranged to brake the said wheel,
   first and second independent fluid circuits operative to feed pressurized fluid to the first and second actuator means, respectively,
   first valve means controlled in dependence on the dynamic state of the wheel and incorporated in the first fluid circuit, and
   second valve means controlled in dependence on the pressure downstream of the first valve means, the second valve means being incorporated in the second fluid circuit and the second valve means being a quantity-regulating valve and comprising
   a first movable member subjected to a control force determined by the pressure downstream of the first valve means and to an opposing force determined by the pressure of fluid delivered by the second valve means, the first movable member being arranged to place the second actuator means in communication with the second fluid circuit or with a fluid outlet, according to the position of the first movable member, and
   a second movable member controlled in dependence on the pressure of the first circuit upstream of the first valve means, and means controlled by said second movable member for locking said first movable member in a position to provide permanent free supply of fluid to the second actuator means when the said first circuit pressure upstream of the first valve means is zero.

2. A braking system according to claim 1, wherein the second actuator means is arranged to brake the said one wheel.

3. A braking system according to claim 1, wherein the second actuator means is arranged to brake a second wheel of the vehicle, the said one wheel and the said second wheel being at the same end of the vehicle.

4. A braking system according to claim 1, wherein the first movable member is a slide subjected at one of its ends to the pressure downstream of the first valve means and at the other of its ends to the pressure which it delivers, said second valve means further comprising
   a duct supplying the delivered pressure, and means controlled by said second movable member for blocking said duct when the pressure prevailing upstream of the first valve means is zero.

5. In a braking system for a vehicle having at least one wheel,
   first and second brake actuator means, at least the first actuator means being arranged to brake the said wheel,
   first and second independent fluid circuits operative to feed pressurized fluid to the first and second actuator means, respectively,
   first valve means controlled in dependence on the dynamic state of the wheel and incorporated in the first fluid circuit, and
   second valve means controlled in dependence on the pressure downstream of the first valve means, the second valve means being incorporated in the second fluid circuit and the second valve means being a quantity-regulating valve and comprising
   a first movable member subjected to a control force determined by the pressure downstream of the first valve means and to an opposing force determined by the pressure of fluid delivered by the second valve means, the first movable member being arranged to place the second actuator means in communication with the second fluid circuit or with a fluid outlet, according to the position of the first movable member, and
   a second movable member controlled in dependence on the pressure of the first circuit upstream of the first valve means, the arrangement being such that when the said first circuit pressure upstream of the first valve means is zero, the second movable member locks the first movable member in a position to continually provide free supply of fluid to the second actuator means
   wherein the said first movable member is a slide subjected at one of its ends to the pressure downstream of the first valve means and at the other of its ends to the pressure which it delivers, said second valve means further comprising
   a duct supplying the delivered pressure, the duct being blocked by the second movable member when the pressure prevailing upstream of the first valve means is zero and wherein,
   the said second movable member is a slide having two equilibrium positions and is subjected in one direction to the pressure prevailing upstream of the first valve means, said second valve means further comprising
   a return spring acting on the second movable member in the opposite direction.

6. A braking system according to claim 5, wherein the second valve means further comprises
   a return spring which acts on the first slide and, in the absence of other forces, maintains the slide in a discharge position.

7. A braking system according to claim 6, wherein the second slide comprises
   a thrust member arranged to transmit the force of the return spring of the second slide to the first slide, the force of the return spring of the second slide being opposed to, and greater than, the force of the return spring of the first slide.

8. A braking system according to claim 7, wherein the second valve means further comprises
   a body having aligned bores, the slides being slidable in the bores.

* * * * *